Feb. 24, 1970  F. W. FELDMANN ET AL  3,496,854
VENTILATED HELMET

Filed March 5, 1968  3 Sheets-Sheet 1

INVENTORS
FREDERICK W. FELDMANN
RODNEY S. HILL
BY
*Michael A. ____*
ATTORNEY

Feb. 24, 1970  F. W. FELDMANN ET AL  3,496,854
VENTILATED HELMET
Filed March 5, 1968  3 Sheets-Sheet 2

INVENTORS
FREDERICK W. FELDMANN
RODNEY S. HILL
BY
ATTORNEY

Feb. 24, 1970　　　F. W. FELDMANN ET AL　　　3,496,854
VENTILATED HELMET

Filed March 5, 1968　　　3 Sheets-Sheet 3

INVENTORS
FREDERICK W. FELDMANN
RODNEY S. HILL
BY
ATTORNEY

United States Patent Office 3,496,854
Patented Feb. 24, 1970

3,496,854
VENTILATED HELMET
Frederick W. Feldmann and Rodney S. Hill, Dover, Del., assignors to ILC Industries, Inc., Dover, Del., a corporation of Delaware
Filed Mar. 5, 1968, Ser. No. 710,461
Int. Cl. F24f
U.S. Cl. 98—1
15 Claims

ABSTRACT OF THE DISCLOSURE

Means for providing positive and noise-free ventilation of moving structures such as vehicles and protective headgear.

---

This invention relates generally to ventilation means and ventilated structures and, more particularly, to means for providing forced ventilation of a structure upon relative movement between the structure and a fluid and to structures, such as vehicles and protective headgear in combination therewith.

Various schemes have heretofore been provided for utilizing the relative movement between a structure and the atmosphere for providing ventilation of the structure. For example, structures such as vehicles are conventionally provided with movable body portions adapted to provide ingress and egress of the outside air, such as side windows, wing vent windows, movable rear windows, or the like. When such movable panels or windows are open for ventilation purposes, however, the flow of air therethrough and therepast often results in the generation of highly turbulent airflow and the generation of substantial accoustical noise. Moreover, the opening of such panels, in addition to enabling the entrance of ventilating air also enables the entrance of various air carried contaminants, such as dust and dirt. Furthermore, when such panels are opened sufficiently to provide good ventilation, a direct and large flow of air is often produced against the occupants of the vehicle which many occupants find objectionable.

To alleviate the problems arising from such ventilation schemes, most vehicles produced today incorporate some form of ram ventilation scoop in the forward portion of the vehicle to provide a forced flow of air into the interior of the vehicle, often under the dashboard and near the floor. Such ram arrangements, however, for both structural and aesthetic reasons have their entrance portions disposed within the engine compartment and relatively close to the ground. Such ventilation rams, accordingly, are positioned at such locations that the amount of contaminants entering with the ventilation air are increased. Ideally, however, the ventilation air for a vehicle should be secured from a much higher location and, most desirably, from adjacent the roof-line of the vehicle.

While it has not been generally recognized, protective headgear or helmets for operators of open vehicles, such as convertibles, sports cars, racing cars, motorcycles, and motor scooters should also preferably be ventilated. The problems involved in ventilating such headgear, however, are even more complex than those involved in ventilating conventional vehicle structures. Firstly, the above-mentioned problems are substantially magnified. The difficulty of providing adequate ventilation without producing objectionable noise levels, for example, is substantially magnified due to the proximity of the ventilation device and the ears of the person wearing the headgear. The cost factor is also magnified substantially due to the relatively lower cost of a helmet shell as compared to a vehicle body. Additionally, any protuberance to protective headgear is highly objectionable unless the protuberance is readily removable or of a break-away design if the safety aspects of such headgear is to be retained. Finally, the openings or passages utilized to provide ventilating airflow through the interior of such headgear must be minimized both in number and size if the protective strength of the headgear or helmet is not to be sacrificed.

Having in mind all of the foregoing, the present invention provides novel and improved ventilation means for structures adapted for movement relative to an air mass.

In addition to the foregoing, the present invention provides such ventilation means which is economical to produce and highly efficient in action.

In addition to each of the foregoing, the present invention provides such ventilation means which provide positive ventilation while producing a minimal noise level.

In addition to each of the foregoing, the present invention provides such ventilation means wherein the degree of ventilation is readily controllable.

The present invention, in addition to each of the foregoing, provides such ventilation means adapted to provide filtration of the ventilating air.

The present invention, in addition to each of the foregoing, provides such ventilation means adaptable for use with substantially any shape or contoured structure.

The present invention, in addition to each of the foregoing, provides such ventilator means which are of a break-away design.

The present invention, in addition to each of the foregoing, provides such ventilation means which are aesthetically appealing and which may be mounted relative to substantially any location or portion of such structure.

The present invention, in addition to each of the foregoing, provides such ventilation means which require only minimal conduits or apertures through the structure.

The present invention, in addition to each of the foregoing, provides such ventilation means which produce a minimal flow of ventilating air against the occupants or operator of such structure or vehicle.

The present invention, in addition to each of the foregoing, provides such ventilation means which provide positive inward and outward flow of ventilating air from the structure.

In addition to each of the foregoing, the present invention provides such ventilating means constructed and arranged for use with protective headgear, such as helmets.

Further, in addition to each of the foregoing, the present invention provides such ventilation means in combination with protective headgear, such as helmets, which increase the ability of the wearer to hear external sounds.

Yet further, in addition to each of the foregoing, the present invention provides ventilation means which may be readily incorporated into structures, such as protective headgear and vehicles during initial construction or fabrication thereof or readily added thereto as an attachment at any time.

Still further, in addition to each of the foregoing, the present invention provides ventilation means which may be utilized either singly or plurality to provide ventilation of structures.

The invention resides in the combination, construction, arrangement and disposition of the various component parts and elements incorporated in improved ventilation means and ventilated structures constructed in accordance with the principles of this invention. The present invention will be better understood and objects and important features other than those specifically enumerated above will become apparent when consideration is given to the following details and description, which when taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

Figure 1:
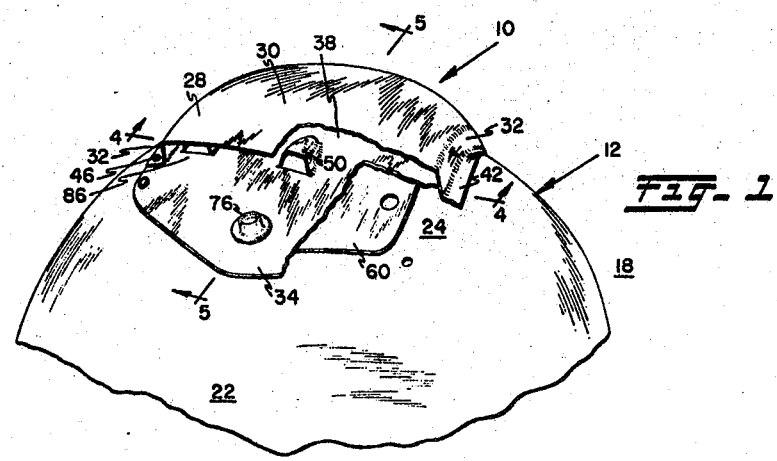
FIG. 1 is a pictorial illustration showing a helmet and ventilation means constructed in accordance with the principles of the present invention viewed generally from the front thereof.
Figure 2:
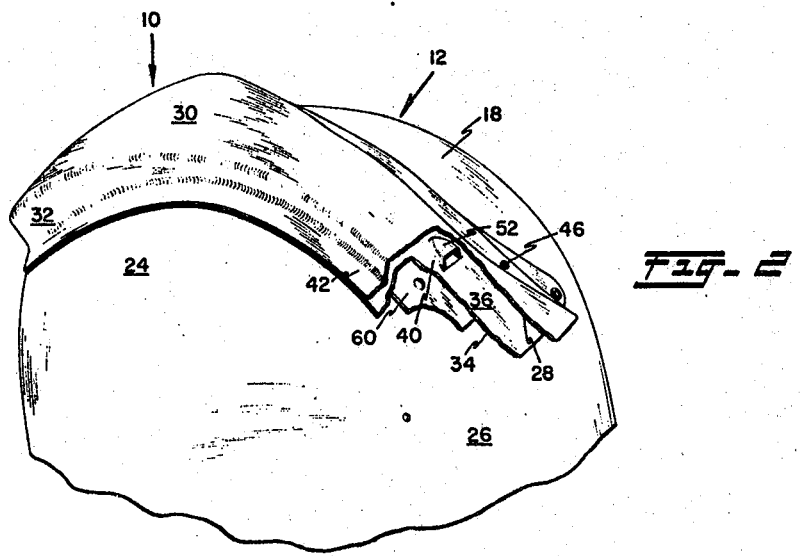
FIG. 2 is a pictorial illustration of the helmet and ventilator means viewed generally from the rear thereof.
Figure 3:
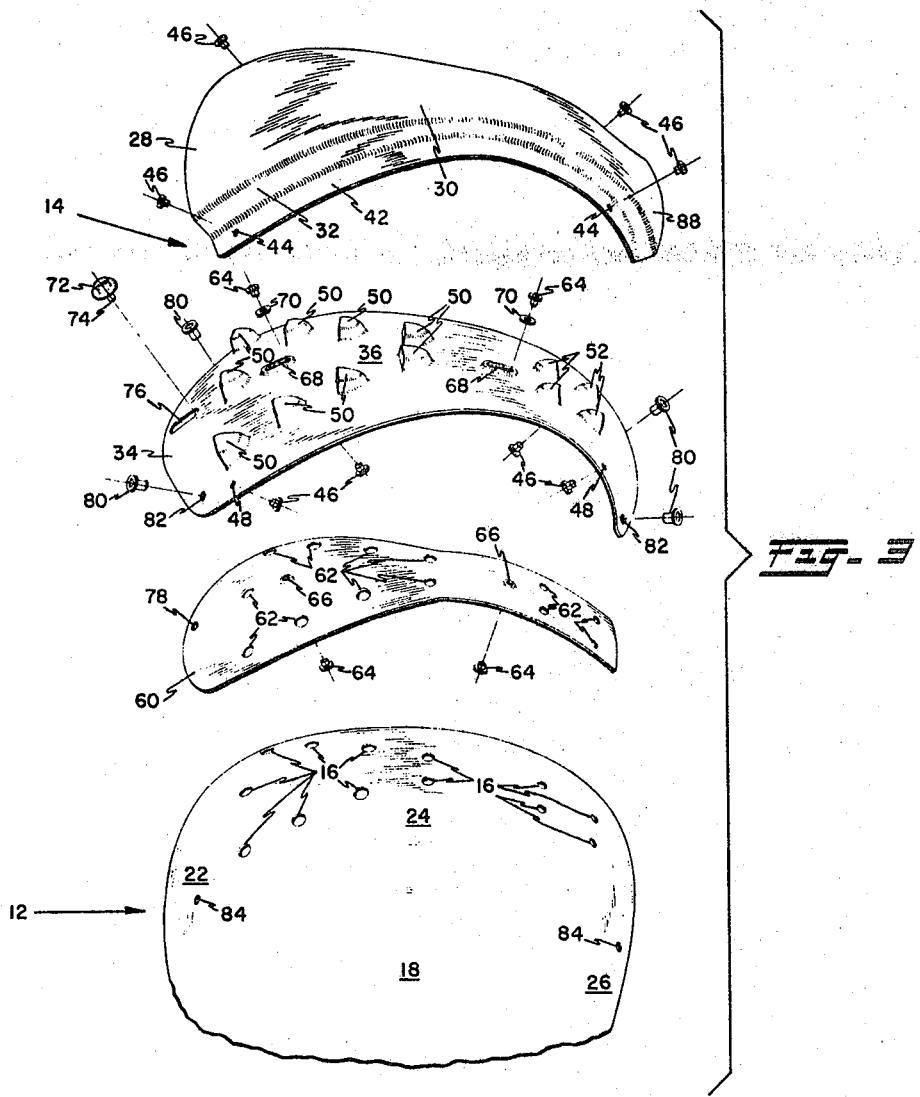
FIG. 3 is a break-away pictorial illustration of the helmet and ventilator means of the preceding figures, viewed generally from one side thereof.
Figure 4:
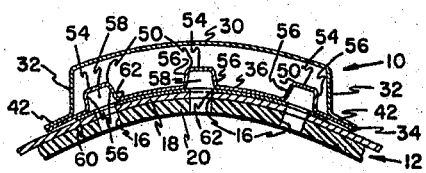
FIG. 4 is a front elevational cross-sectional view taken along line 4—4 of FIG. 1.
Figure 5:
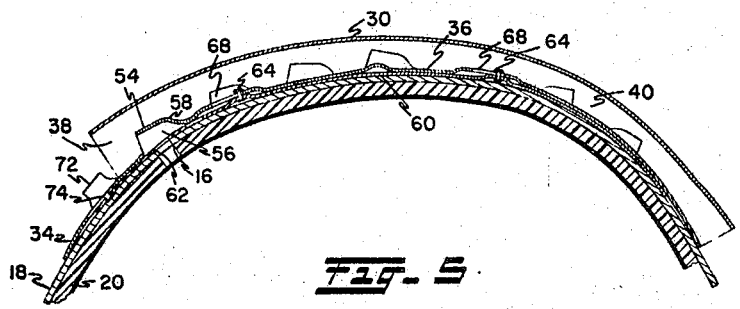
FIG. 5 is a side elevational cross-sectional view taken along line 5—5 of FIG. 1.

With reference now to the drawing, and particularly to FIGS. 1–5 thereof, there is shown and illustrated ventilation means constructed in accordance with the principles of the present invention and designated generally by the reference character 10. The ventilation means is shown and illustrated mounted on and in combination with a structure to be ventilated and, more particularly, secured to and in combination with a protective headgear, such as a protective helmet assembly designated generally by the reference character 12.

At the outset, it is to be expressly understood that while the present invention is described, disclosed, illustrated and shown in combination with vehicle related structures, such as crash helmets and automobile bodies, the ventilator means of the present invention is adaptable for use in combination with substantially any structure wherein relative movement may be provided between the ventilator means and a fluid.

The ventilator means 10 may comprise air conveying means 14 for providing regions of pressure differentials upon movement of fluid relative thereto and means, such as air passage means defined, for example, by a plurality of apertures 16, for enabling fluid transfer with the interior of a structure, such as the helmet 12.

The helmet 12 may be of substantially any desired construction and arrangement and may, for example, comprise a helmet shell or wall 18 and a helmet liner 20 disposed interiorly thereof. The helmet 12 shown is of generally curvilinear configuration having an anterior portion 22 adapted to be disposed generally over the frontal bone of the wearer's skull, a mesial portion 24 adapted to be disposed generally over the parietal bone of the wearer's skull and generally parallel to the flow of air and a posterior portion 26 adapted to be disposed generally over the occipital bone of a wearer's skull.

The means 14 may comprise an outer shell or air conveying and directing trough shield 28 constructed and arranged to define a top wall portion 30 and a plurality of side wall portions 32 extending generally perpendicularly downwardly thereof to form an air flow path. The means 14 may further comprise inner shell means 34 constructed and arranged for structural association with the outer shell 28 to define a bottom wall portion 36 therefor and to further define therewith air passage means which may have longitudinally spaced apart portions of diverse cross-sectional area.

For example, the air passage means may be of venturi configuration, having a generally inwardly convergent entrance portion 38 and a throat portion 40. The generally inwardly convergent entrance portion 38 provides increasing velocity head in fluid flowing therethrough while the throat portion 40 provides a maximum velocity head.

The outer shell 28 may be structurally associated with the inner shell 34 as by means of flanges 42 integrally formed therewith provided with apertures 44 through which rivets or eyelets 46 are adapted to be inserted. The inner shell 34 may be provided with apertures 48 adapted to be disposed in general alignment with the apertures 44 so that the rivets or eyelets 46 may pass therethrough to secure the outer shell 28 and the inner shell 34 together.

The means 14 may further comprise means for deriving pressure head from the velocity head of the fluid within the passage means. The pressure deriving means may, for example, comprise fluid flow impeding means, such as structures having openings disposed relative to or within the fluid stream, such as a plurality of upstream and downstream facing or directed scoops 50 and 52, respectively. The scoops 50 have their air intake openings facing upstream and the scoops 52 have their air outlet openings facing downstream of the air that passes the scoops when the structure is in motion.

The upstream facing or directed scoops or structures 50 may be disposed within the convering entrance portion 38 of the venturi or air passage so that the moving fluid impinging against the scoops 50 will produce an increased pressure therein. The downstream facing or directed scoops or structures 52 may be positioned within the throat portion 40 so that the flow of fluid therepast will produce a reduced pressure therein. Accordingly, a substantial pressure differential will be produced between the upstream directed or facing scoops 50 and the downstream facing or directed scoops 52. The upstream facing or directd scoops or structures 50 may further be disposed in staggered relationship, as shown, so that a relatively unimpeded flow of fluid will be seen by the openings of each of the scoops or structures 50.

The side wall portions 32 of the outer shell 28 may be of generally curvilinear configuration, as shown, to define the generally converging entrance portion 38 and the throat portion 40. Furthermore, the top wall portion 30 of the outer shell 28 may be constructed and arranged relative to the inner shell 34 so that the portion defining the throat portion 40 is spaced a lesser distance from the bottom wall portion 36 of the inner shell 34 than the spacing between the portion of the outer shell 28 and the bottom wall portion 36 of the inner shell 34 defining the entrance portion 38. Hence, the passage or venturi may converge in either or both the horizontal and vertical planes.

The scoops or structures 50 and 52 may be of substantially similar configuration and, accordingly, only the scoops or structure 50 will be herein described in detail, it being expressly understood that the scoops or structures 52 may be similar. The scoops or structures 50, for example, may comprise a top wall portion 54, a pair of side wall portions 56 and a generally smoothly closed rear wall portion 58, with the apertures 16 being disposed for communication with the interior of the scoops or structures 50 and generally adjacent the rear wall portion 58.

Damper means, such as a damper or baffle plate 60 may be provided, such as between the inner shell 34 and the helmet shell 18 constructed and arranged to enable control of fluid flow through the apertures 16. For example, the damper or baffle plate 60 may be slidably structurally associated with the inner shell 34. The damper or baffle plate 60 may comprise plurality of apertures 62 adapted to be selectively disposed in alignment with the apertures 16 or in disalignment relative thereto. The damper or baffle plate 60 may be structurally associated with the inner shell 34 as by means of eyelets or rivets 64 extending through apertures 66 provided in the damper or baffle plate 60 and elongated slots 68 provided in the inner shell 34. Washers 70 may be provided for engagement by the rivets or eyelets 64. A control member or handle 72 having a stem or rivet portion 74 may be structurally associated with the damper plate 60 for controlling the movement thereof. For example, the inner shell 34 may be provided with an elongated slot 76 for enabling the passage therethrough of the stem 74 of the control member 72 and the damper plate 60 may be provided with an aperture 78 enabling the stem or rivet portion 74 of the control member 72 to be structurally associated therewith.

The ventilation means 10 may be secured with the helmet shell 18 in any desired manner but it is preferably secured therewith by means of frangible or break-away fasteners, such as snap-type fasteners 80 which may, for example, extend through apertures 82 and 84 extending through the inner shell 34 and helmet shell 18, respectively. The ventilation means 10 is preferably disposed in a generally crest-like, generally centrally upstanding position, as shown. It is to be expressly understood, however, that the ventilation means 10 need not be so disposed but may be disposed at substantially any generally fore-aft position. Moreover, a plurality of such means may be utilized with a single structure, as by way of example only, on each side thereof.

While the various dimensions and relationships of the outer shell 28, inner shell 34, scoops 50 and 52, and apertures 16 may vary within wide limits, it has been found that certain general configurations and relationships thereof are especially suitable for use with protective headgear, such as helmets. For example, for a protective helmet of generally conventional shape and configuration, it has been found that entrance dimensions to the air passage or venturi of approximately 3¾ inch width by ⅝ inch height; throat dimensions of approximately 1¼ inch width by ⅜ inch height; a throat length of approximately 4 inches and an entrance portion length of approximately 5½ inches produce a suitable operation. It has further been found that nine upstream facing scoops 50 and four downward facing scoops 52 are appropriate, with the downstream directed scoops 52 having a ¼ inch width and a ¼ inch height; the 7 forwardmost upstream directed scoops 50 having approximately ⁷⁄₁₆ inch width and ¼ inch height; and the two rearwardmost upstream directed scoops having a ⅜ inch width by a ¼ inch height provide a sufficient degree of ventilation, with the apertures 16 being approximately ⁵⁄₁₆ inch diameter for the ⁷⁄₁₆ inch wide scoops, ¼ inch diameter for the ⅜ inch wide scoops and ³⁄₁₆ inch for the ¼ inch wide scoops.

The ventilated helmet of the present invention has been found to provide substantially increased comfort to the wearer. For example, in a series of tests conducted at speeds of 50 to 70 miles per hour movement with an ambient air temperature of approximately 91° F., a thermistor probe disposed within a conventional, unvented helmet indicated temperatures ranging from three to seven and a half degrees above ambient temperature, while with ventilated helmets constructed in accordance with the present invention, the temperature indicated by a similarly disposed thermistor probe ranged from one to three and a half degrees below ambient temperature. With both helmets, the indicated interior temperature without movement ranged from six to ten degrees above ambient temperature.

Moreover, the ventilated helmet constructed in accordance with the present invention was found to be quiet, i.e., the ventilation means did not generate any substantial noise. In fact, it was found that users of ventilated helmets constructed in accordance with the principles of this invention found that they could hear substantially better than with a conventional unventilated helmet, i.e., they could hear approaching vehicles and outside sounds far better than with a conventional helmet. Additionally, it is a feature of the present invention that the small size of the apertures 16 does not substantially weaken the structural integrity of the helmet shell.

Air filtration means, such as a screen or matted fibrous pad 86 may be disposed within or adjacent the inlet of the entrance portion 38. Furthermore, the outer shell 28 may be provided with a generally outwardly divergent exhaust portion 88 to enable a smooth, lowered velocity exhaust of the fluid passing through the venturi.

At this point, it is to be noted that the ventilation means 10 hereinbefore described and disclosed is of generally curvilinear configuration and, more particularly, it is configured generally to the contour of the structure or helmet 12. Ventilation means may, however, be constructed in accordance with the principles of the present invention which is of generally planar configuration.

Figure 6:
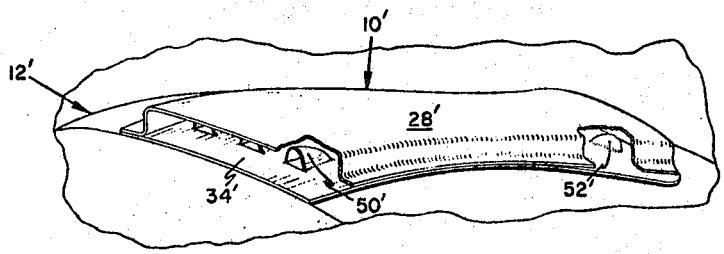
FIG. 6 is a pictorial illustration of a portion of a structure having a generally planar surface, such as the roof portion of a passenger automobile provided with ventilation means constructed in accordance with the principles of this invention.

Accordingly, and with reference now to FIG. 6, there is shown and illustrated other ventilation means of generally planar configuration constructed in accordance with the principles of the present invention and designated generally by the reference character 10' illustrated in combination with a structure having a generally planar top surface, such as a passenger vehicle 12'.

The ventilation means 10' is substantially similar to the ventilation means heretofore described and disclosed and, accordingly, a detailed description thereof is not believed necessary, but, rather, in the interest of conciseness it is deemed sufficient to point out that the ventilation means 10' may define a venturi provided with upstream directed structures or scoops 50 in the forward portion thereof and downstream directed structures or scoops 52 in the rearward portion thereof.

In the operation of the ventilation means of the present invention, it is believed readily obvious that the increased pressure produced by the upstream directed or facing scoops or structures 50 and 50' and the decreased pressure produced by the downstream directed or facing scoops or structures 52 and 52' produces a maximum and substantial pressure differential therebetween. If the upstream directed or facing and downstream directed or facing scoops or structures are in fluid communication with the forward and rearward portions of a structure, as by means of the apertures 16, a flow of ventilating air will be produced therein. As heretofore pointed out, the ventilation produced thereby is quiet and efficient. The ventilation means may be inexpensively produced and, for example, may be entirely molded of plastic, or the like, or may be stamped or otherwise formed of sheet metal, or the like.

It is to be understood that terminology such as "forward" or "forwardly," "rearward" or "rearwardly," "upwardly," "downwardly," "top," and "bottom," as used in the preceding description and in the subjoined claims, along with other similar directional terminology, is to be construed and interpreted in its normal and accepted sense. However, such terminology is not to be construed or interpreted in a limiting sense either in the preceding description or the subjoined claims, since the same is used merely to facilitate an understanding of, and to clearly set forth and particularly define the present invention.

While the invention has been described, disclosed, illustrated and shown in terms of certain preferred embodiments or modifications which it has assumed in practice, the scope of the invention should not be deemed to be limited by the precise embodiments or modifications herein described, disclosed, illustrated or shown, such other embodiments or modifications as may be suggested to those having the benefit of the teachings herein being intended to be reserved especially as they fall within the scope and spirit of the claims hereto appended.

What is claimed is:

1. A device for ventilating moving structures comprising a walled structure, the wall of said structure defining apertures therethrough; an air conveying means positioned on the outer surface of said structure and defining therein a flow path therethrough for directing and confining a stream of air through the flow path during movement of said structure, said flow path having a constriction means therein for producing an area of reduced pressure in the downstream portion thereof when air passes through said flow path; air intake scoop means positioned in upstream portion of said flow path and operatively connected to a portion of said apertures for admitting a portion of the air passing through said flow path into the interior of said structure; air outlet scoop means positioned in the downstream portion of said flow path in the area of reduced pressure and operatively connected to the remaining portion of said apertures for removing air from the interior of said structure into the portion of the stream of air passing completely through said flow path during movement of said structure.

2. The device of claim 1 in which air intake scoop means faces upstream and the air outlet scoop means faces downstream of the air passing through said conveying means.

3. The device of claim 1 in which the air intake scoop means is angularly positioned with respect to the air outlet scoop means.

4. The device of claim 1 in which said air intake scoop means is formed from a plurality of spaced scoops facing upstream of said air that passes through said conveying means and said air outlet scoop means is formed from a plurality of spaced scoops facing downstream.

5. The device of claim 1 in which said means for conveying air over said intake and outlet scoop means is a venturi having said air intake scoop means in the convergent entrance portion and said air outlet scoop means in the throat portion.

6. The device of claim 1 in which a substantial pressure differential is produced between the area surrounding said air intake scoop means and the area surrounding said air outlet scoop means.

7. The device of claim 1 in which said air conveying means has filter means in its air entrance portion to prevent foreign matter from entering the air intake scoop means.

8. The device of claim 1 in which said structure is a helmet.

9. The device of claim 1 in which said structure is a vehicle.

10. The device of claim 1 in which said air intake scoop means are arranged in staggered relationship with respect to each other so as relatively to unimpede the flow of air passing through said directing and conveying means.

11. The device of claim 1 in which an aperture closing means is operatively associated with said air intake and air outlet scoop means and said apertures for adjustably controlling the amount of air passing into and from said structure.

12. A helmet device for self-ventilating when moving through air comprising a helmet body adapted to fit the head of a wearer, said helmet body having a wall defining spaced apertures therethrough; a plurality of air intake scoop means positioned on the outer surface of said helmet and operatively connected to a portion of said apertures, said air intake scoop means having openings that face outward from the front of the helmet; a plurality of air outlet scoop means positioned on the outer surface of said helmet and operatively connected to the remaining portion of said apertures, said outlet scoop means having openings that face rearward from the back of the helmet; an air conveying means defining a flow path therethrough positioned on the outer surface of said helmet and defining a flow path therein with said air outlet scoop means and said air inlet scoop means positioned in said flow path, said conveying means having its air ingress opening positioned at the front of the helmet and its air egress opening positioned at the rear of the helmet for conducting a stream of air therethrough; a constricting throat means positioned in said flow path downstream of said intake scoop means for producing an area of reduced pressure in the area of said outlet scoop means, whereby movement of said helmet on the head of a wearer causes air to enter said flow path through said ingress opening and pass over said inlet scoop means where a portion of the air enters the helmet and the remaining portion of the air passes through the constricting throat producing reduced pressure in the area of said outlet scoop means and air is drawn from said helmet into the area of reduced pressure in the flow path and then carried out of the flow path through the egress opening together with the portion of the air flowing past the constricting throat.

13. The helmet device of claim 12 in which said air intake and air outlet scoop means are formed from a plurality of spaced air scoops, said intake scoops facing upstream and said outlet scoops facing downstream of the air passing through said conveying means.

14. The helmet device of claim 13 in which the air intake scoops are located on the forward, downward compound curvature of the upper portion of the helmet body and the air outlet scoops are located on the backside, downward compound curvature of the upper portion of the helmet body.

15. The device of claim 12 in which the air intake and the air outlet scoop means and the air conveying means are secured to said helmet by break-away attaching means so that an impact stress will cause said trough shield means to break away from said helmet.

References Cited

UNITED STATES PATENTS

| | | | |
|---|---|---|---|
| 3,228,317 | 1/1966 | Westman | 98—1 |
| 1,977,215 | 10/1934 | Strauss | 2—3 |
| 1,982,747 | 12/1934 | Kurth | 98—8 |
| 1,988,101 | 1/1935 | Wittcoff | 2—182.6 |
| 2,144,870 | 1/1939 | Bullard | 2—3 |
| 2,151,097 | 3/1939 | Germonprez | 98—8 |
| 2,159,681 | 5/1939 | Wisman | 2—3 |
| 2,250,614 | 7/1941 | Willer | 98—13 |
| 2,635,523 | 4/1953 | Hunter | 98—13 |
| 2,854,914 | 10/1958 | Galbraith | 98—13 |

LLOYD L. KING, Primary Examiner

U.S. Cl. X.R.

2—3